United States Patent [19]

Seidler

[11] 4,073,530

[45] Feb. 14, 1978

[54] PARTS PICK UP AND MANIPULATING DEVICES

[76] Inventor: David Seidler, 69-10 108th St., Forest Hills, N.Y. 11375

[21] Appl. No.: 753,667

[22] Filed: Dec. 23, 1976

Related U.S. Application Data

[63] Continuation-in-part of Ser. No. 657,349, Feb. 11, 1976, abandoned.

[51] Int. Cl.$^2$ .......... B25J 1/02

[52] U.S. Cl. .......... 294/19 R; 294/1 R

[58] Field of Search .......... 294/1 R, 1 CA, 19 R, 294/27 R, 64 R, 64 A, 64 B, 65.5, 86 R; 15/104 A; 81/3 R; 221/210; 271/33

[56] References Cited

U.S. PATENT DOCUMENTS

| | | | |
|---|---|---|---|
| 517,295 | 3/1894 | Pulling | 271/33 |
| 2,708,761 | 5/1955 | Bergquist | 15/104 A |
| 3,342,519 | 9/1967 | Hunt et al. | 294/1 R X |
| 3,658,618 | 4/1972 | Gramann | 294/1 R X |
| 3,797,875 | 3/1974 | den Hamer | 294/1 R |
| 3,843,183 | 10/1974 | Hutson | 294/64 R |
| 3,864,993 | 2/1975 | Hovind | 15/104 A X |
| 3,974,539 | 8/1976 | Barouh et al. | 294/1 R X |

*Primary Examiner*—Johnny D. Cherry

*Attorney, Agent, or Firm*—Blum, Moscovitz, Friedman & Kaplan

[57] ABSTRACT

Parts pick-up and manipulating devices are provided which are especially suitable for use with small or easily damaged or difficult to pick up parts. A device is provided with a handle portion and a pick up portion with the pick up portion being coated with a pressure-sensitive adhesive. The pick up portion has a contact area sufficient to be able to securely pick up and manipulate parts which have a generally planar contact surface. The pick up portion is constructed so as to be easily flexed or maneuvered in order to reduce the contact area in order to release the part from the pick up device.

15 Claims, 12 Drawing Figures

FIG. 2
FIG. 1
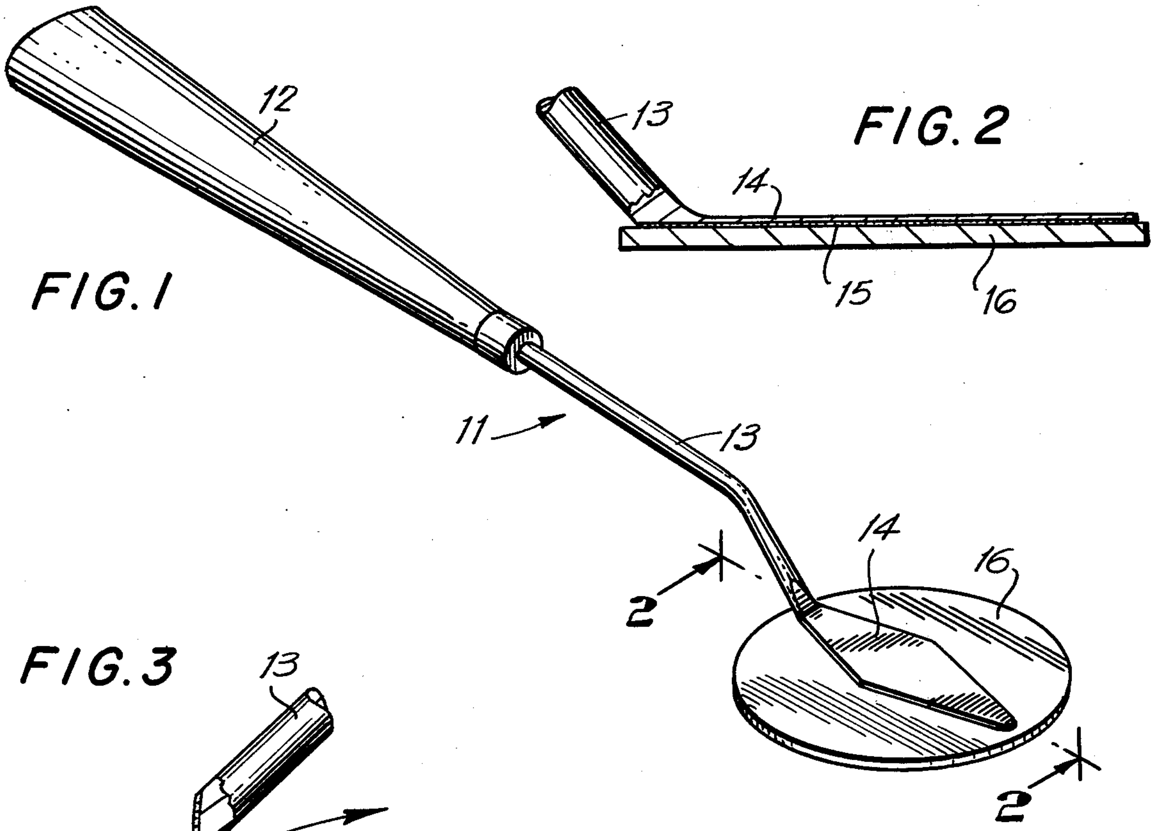
FIG. 3
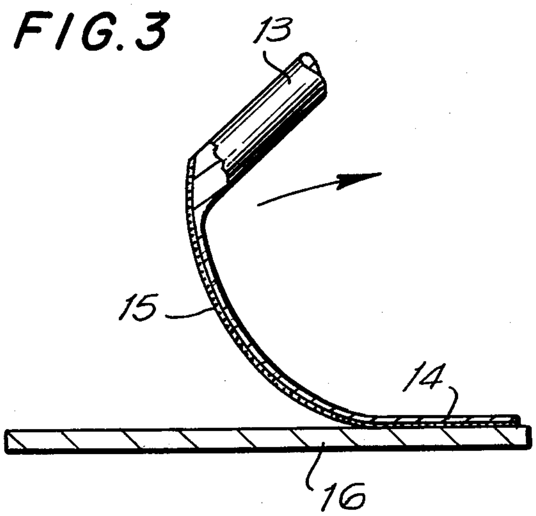
FIG. 5
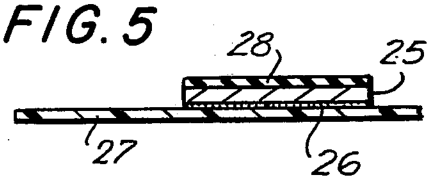
FIG. 4
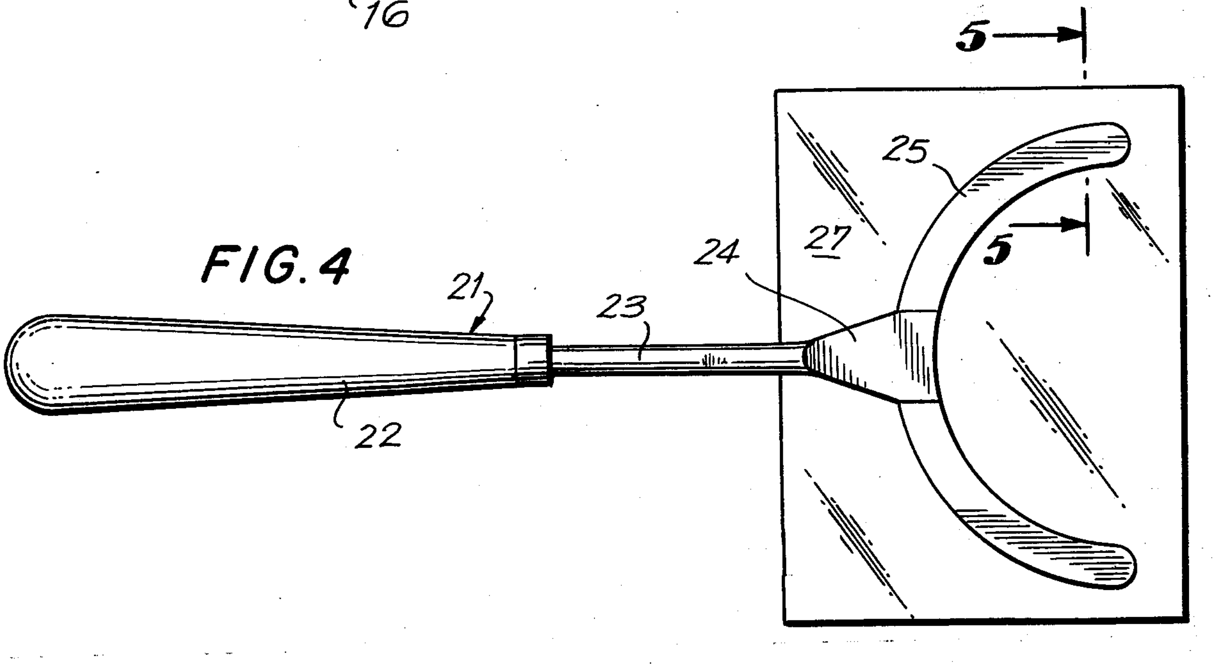

PARTS PICK UP AND MANIPULATING DEVICES

CROSS REFERENCE TO RELATED APPLICATION

This application is a Continuation-in-Part of application Ser. No. 657,349 filed Feb. 11, 1976 now abandoned.

BACKGROUND OF THE INVENTION

This invention relates generally to parts pick up and manipulating devices. Small or generally difficult to manipulate parts and parts which can be contaminated by touch are generally picked up and manipulated using tweezers and vacuum pick-up devices. Especially with respect to parts that are easily damaged, tweezers have been found less than satisfactory although in wide use. With extremely small parts which are very thin, tweezers have proven most unsatisfactory.

SUMMARY OF THE INVENTION

Generally speaking, in accordance with the invention, parts pick up and manipulating devices are provided which can pick up without damage or contamination substantially any part and can readily manipulate and maneuver and deposit the part at any desired location. The pick up function is provided by means of a pick up portion of a device which also has a handle portion. The pick up portion is coated with a pressure sensitive adhesive which is preferably washable so as to renew the pressure sensitive surface if its pick up ability is reduced as a result of contamination by dirt or other foreign matter. The pick up portion has a surface area of pressure sensitive adhesive which is sufficient to be capable of holding the part to be picked up and manipulated and the pick up device is arranged so that the contact area with the part can be substantially reduced so as to release the pick up action.

The devices of the present invention will find wide use in many industries which deal with small and/or easily damaged parts. A prime example is the electronic industry which deals in small and easily damaged wafers, chips and die which carry micro circuits and other electronic components. Also, small components must be manipulated in the jewelry industry and in the medical and dental professions. While the instant invention is not limited to use in any particular industry or any particular types of art, the foregoing examples come immediately to mind.

Accordingly, it is an object of this invention to provide improved parts pick up and manipulating devices.

Another object of the invention is to provide an improved device capable of picking up and releasing a small part without damaging same.

A further object of the invention is to provide an improved device capable of picking up and releasing a small part without contaminating any portion thereof.

Still other objects and advantages of the invention will in part be obvious and will in part be apparent from the specification.

The invention accordingly comprises an article of manufacture possessing the features, properties, and the relation of elements which will be exemplified in the article hereinafter described, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 1 is a perspective view of a first form of parts pick up and manipulating device constructed in accordance with the teachings of the instant invention with the pick up portion being shown in contact with a wafer of the type from which micro circuits are made.

FIG. 2 is a partial sectional view taken along line 2—2 of FIG. 1;

FIG. 3 is a view similar to FIG. 2 but showing the pick up portion of the device flexed to reduce surface contact area and release the wafer;

FIG. 4 is a top plan view of a second form of parts pick up and manipulating device with a protective sheet in position;

FIG. 5 is a partial sectional view taken along line 5—5 of FIG. 4;

DESCRIPTION OF THE PREFERRED EMBODIMENTS

Figure 6:
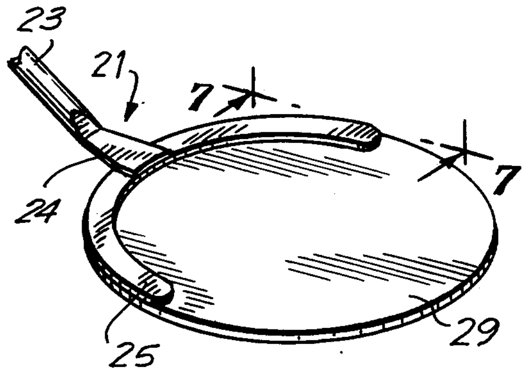
FIG. 6 is a partial perspective view of the device of FIG. 4 used for picking up and depositing a wafer.

Referring now to FIG. 1, a parts pick up and manipulating device is indicated generally at 11 and includes a handle 12 and an operative shaft 13 carried by handle 12 which terminates in a pick up portion 14. Pick up portion 14 and shaft 13 are preferably fabricated of anti-magnetic tempered stainless steel so as to be suitable for use in the electronics industry. The pick up portion is shown as generally diamond-shaped in plan and is sufficiently thin to be readily flexed. As best seen in FIG. 2, the bottom surface of pick up portion 14 is coated with a pressure sensitive adhesive layer 15. Any suitable adhesive may be used and washable silicone-base adhesives have been found to be quite effective.

As shown in FIGS. 1 and 2, the exposed tacky adhesive portion of the device is brought into contact with a generally planar surface of a part to be picked up. A circular disc 16 is shown and may be a wafer used in the electronics industry for forming a plurality of micro circuits.

By controlling the tackiness of the adhesive coating 15, by knowing the surface area of pick up portion 14 and by knowing the weight of disc 16, a parts pick up device can be provided which will have sufficient contact force to permit pick up and manipulation of the disc 16 without the possibility of dropping the disc. Selenium discs are particularly expensive and the high breakage rate is particulary costly to the electronics industry.

After the disc has been picked up and moved to a desired location, it can be redeposited in the manner best seen in FIG. 3. By rotating shaft 13 through handle 12, a pick up portion or blade 14 is flexed while applying pressure to hold disc 16 on its support surface. In this manner, the tip end of blade 14 applies a hold-down pressure to disc 16 while the major contact area of adhesive layer 15 is caused to separate from the surface of disc 16. When the contact area has been reduced sufficiently, it is merely necessary to lift device 11 and the disc will remain in the deposited position.

The adhesive layer 15 provides a cushioning or protective coating to blade 14 so as to avoid the possibility of damage to the surface of the disc. Also, by using a washable silicone-base adhesive, it has been found that the surface of the disc is not contaminated.

When not in use, it is desirable that a protective sheet be provided for engagement with adhesive layer 15 to prevent contamination of the adhesive layer as discussed more fully in connection with the next embodiment.

Referring now to FIGS. 4 through 7, a parts pick up device is indicated generally at 21 and includes a handle 22 and a shaft 23 which terminates at a flattened end 24. Secured to flattened end 24 is a semi-circular blade or pick up portion 25 fabricated of flexible material, preferably antimagnetic tempered stainless steel. Applied to the bottom surface of blade 25 as shown in FIG. 5 is an adhesive layer 26 similar to adhesive layer 15. A protective release sheet 27 is provided for protecting against contamination of adhesive layer 26 when the parts pick up device is not in use. Sheet 27 may be formed of any suitable material such as polyvinyl chloride, mylar or the like.

If desired, the top surface of blade 25 may be coated with a layer 28 of rubber or other suitable material to prevent the top surface of blade 25 from making damaging contact with a part to be picked up in certain types of applications where manipulation of the parts pick up device into engagement with one part could bring the blade into contact with other parts.

Figure 7:
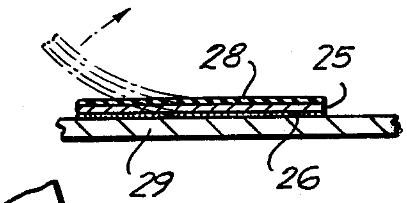
FIG. 7 is a partial sectional view taken along line 7—7 of FIG. 6 with the parts pick up portion in flexed condition shown in phantom lines.

The embodiment of FIGS. 4 through 7 is especially suitable for picking up large sized discs and wafers such as disc 29. In FIG. 6 parts pick up device 21 is shown with adhesive layer 26 in contact with the surface of disc 29. In order to deposit disc 29, blade 25 is flexed as represented in FIG. 7 to release a substantial portion of the contact area from the surface of the disc so that the parts pick up device 21 can be lifted off the disc.

Figure 8:
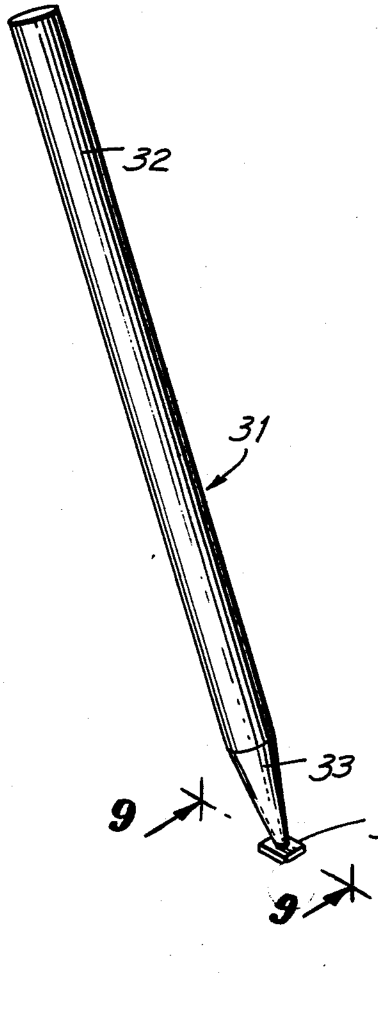
FIG. 8 is a perspective view of another form of parts pick up device in engagement with a small part to be manipulated.
Figure 9:
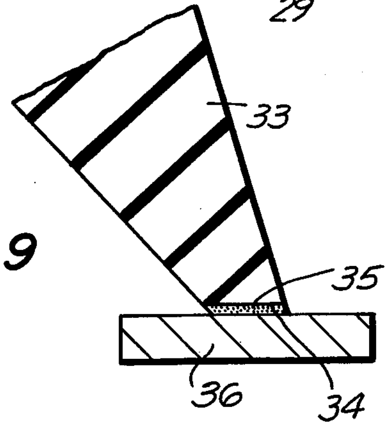
FIG. 9 is a partial sectional view, at an enlarged scale, taken along line 9—9 of FIG. 8.
Figure 10:
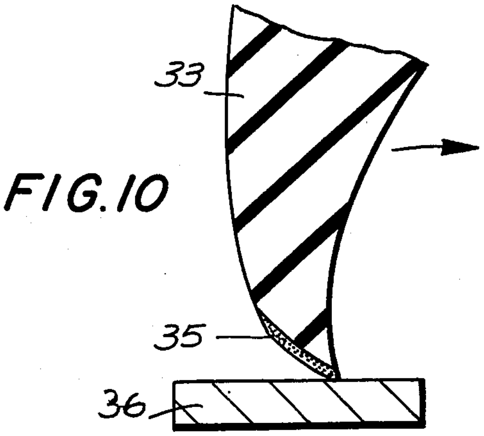
FIG. 10 is a view similar to FIG. 9 but showing the part being released by the pick up device.

A further embodiment of a parts pick up device is shown in FIGS. 8 through 10 wherein the device is indicated generally at 31. The device consists of a handle 32 in the form of a cylindrical shaft and a cone-shaped pick up portion 33. Handle 32 may be formed as a tubular light-weight metal or plastic shaft carrying pick up portion 33 which is preferably formed of soft and pliable plastic or rubber. The tip end 34 of pick up portion 33 is preferably cut on a bias as best seen in FIG. 9 and has applied thereto a layer of pressure sensitive adhesive 35. Small part 36 such as an integrated circuit is shown in contact with adhesive layer 35 for picking up and manipulating part 36. With pick up portion 33 being formed of extremely soft rubber, the possibility of damage to the integrated circuit is substantially eliminated.

In order to deposit part 36, it is merely necessary to rotate the pick up device as shown in FIG. 10 in order to release the major area of adhesive layer 35 from engagement with the surface of part 36 whereby the parts pick up device may be lifted off part 36.

Figure 11:
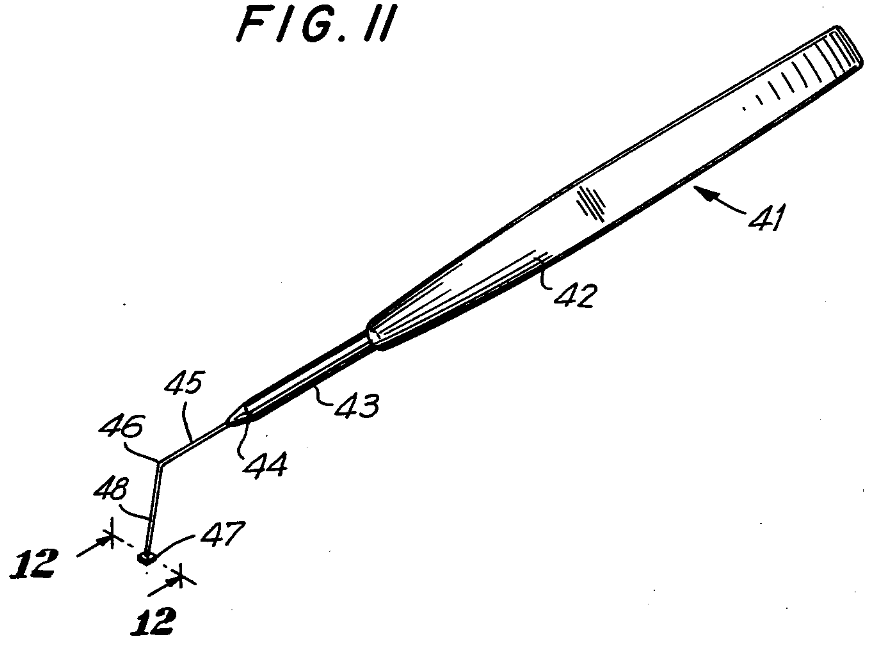
FIG. 11 is a perspective view of another form of parts pick up device in engagement with an extremely small part to the manipulated.
Figure 12:
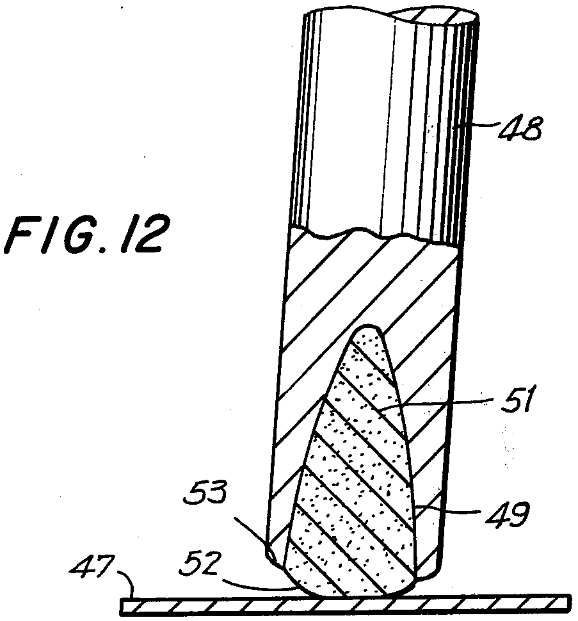
FIG. 12 is a partial sectional view, at an enlarged scale, taken along line 12—12 on FIG. 11.

Another embodiment of a parts pick up device is shown in FIGS. 11 and 12 wherein the device is indicated generally at 41. The device consists of a handle 42, a collar 43 having a conical tip 44 and a flexible wire 45. Handle 42 is preferably in the shape of a flattened oval for easy manipulation of device 41. Wire 45 has a bend 46 so that it and handle 42 are properly oriented for easiest manipulation of an extremely small part 47 such as a micro-circuit. The tip end 48 of wire 45 is hollow forming a conoidal opening 49. Filling opening 49 is pressure-sensitive adhesive 51. The outer surface 52 of adhesive 51 is rounded and extends beyond the edge 53 of tip 48 so that only the adhesive 51, not tip 48, will contact part 47 in order to prevent damage. In order to release part 47 from device 41, it is merely necessary to tilt device 41 to either side which frees adhesive 51 from engagement with the surface of part 47 so that device 41 may be lifted from part 47.

The foregoing four embodiments of a parts pick up and manipulating device are representative of preferred embodiments of the instant invention. It should be evident that other forms of the pick up device are contemplated. The operative elements are the flexible pick up portion having a contact surface coated with a pressure sensitive adhesive and a handle for manipulating the pick up portion. Means should be provided for protecting the pressure sensitive layer when not in use such as a sheet of release paper or a cap for a device of the types shown in FIGS. 8 and 11.

It will thus be seen that the objects set forth above, among those made apparent from the preceding description, are efficiently attained and, since certain changes may be made in the above article without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A parts pick up and manipulating device for adhesive engagement with a part to be manipulated comprising a rigid handle portion, a pick up portion joined to said handle portion and a pressure sensitive adhesive applied to a selected area of said pick up portion, the extent of said area being selected in relation to the part to be picked up so that the part will not become disconnected during manipulation of the part, the part being disconnectable from the pick up portion by reducing the amount of said area in engagement with the part, said pick up portion being flexible throughout said area whereby the amount of said area in engagement with the part can be reduced by the flexing of said pick up portion through said handle.

2. A parts pick up and manipulating device as claimed in claim 1, wherein said rigid handle portion and said pick up portion are offset from each other.

3. A parts pick up and manipulating device as claimed in claim 1, wherein said handle portion and said pick up portion are non parallel.

4. A parts pick up and manipulating device as claimed in claim 1, wherein said pick up portion is in the form of a thin blade-like planar member.

5. A parts pick up and manipulating device as claimed in claim 4, wherein said blade-like member has oppositely facing surfaces, said pressure-sensitive adhesive being applied to one of said surfaces.

6. A parts pick up and manipulating device as claimed in claim 5, wherein said blade-like member is substantially diamond-shaped.

7. A parts pick up and manipulating device as claimed in claim 5, wherein said blade-like member is substantially U-shaped.

8. A parts pick up and manipulating device as claimed in claim 1, further including means for protecting said pressure-sensitive adhesive from contamination when said parts pick up and manipulating device is not in use.

9. A parts pick up and manipulating device as claimed in claim 1, wherein said pick up portion is in the form of a truncated cone.

10. A parts pick up and manipulating device as claimed in claim 1, wherein said flexible pick up portion comprises a wire.

11. A parts pick up and manipulating device as claimed in claim 10, said wire having a hollow tip and said pressure-sensitive adhesive filling said hollow tip.

12. A parts pick up and manipulating device comprising a rigid handle portion, a flexible pick up portion joined to said handle portion, said pick up portion being in the form of a thin blade-like planar member having oppositely facing surfaces, a pressure sensitive adhesive applied to a selected area of one of said oppositely facing surfaces and a layer of soft protective material being applied to the other of said oppositely facing surfaces.

13. A parts pick up and manipulating device comprising a rigid handle portion, a flexible pick up portion joined to said handle portion, said pick up portion being in the form of a truncated cone, the apex of said cone defining a surface, and a pressure sensitive adhesive applied to said surface.

14. A parts pick up and manipulating device comprising a rigid handle portion, a flexible pick up portion joined to said handle portion, said flexible pick up portion comprising a wire, said wire having a tip with a conoidal-shaped recess therein, and a pressure sensitive adhesive filling said recess.

15. A parts pick up and manipulating device as claimed in claim 14, wherein said pressure-sensitive adhesive extends out of said hollow tip beyond the tip end thereof.

* * * * *